United States Patent
Schweizer (10) Patent No.: US 11,638,983 B2
(45) Date of Patent: May 2, 2023

(54) METHOD FOR CHECKING A GRINDING TOOL AND CORRESPONDING DEVICE

(71) Applicant: Klingelnberg GmbH, Hückeswagen (DE)

(72) Inventor: Martin Schweizer, Rastatt (DE)

(73) Assignee: KLINGELNBERG GMBH, Hückeswagen (DE)

( * ) Notice: Subject to any disclaimer, the term of this patent is extended or adjusted under 35 U.S.C. 154(b) by 1034 days.

(21) Appl. No.: 16/242,092

(22) Filed: Jan. 8, 2019

(65) Prior Publication Data

US 2019/0210183 A1    Jul. 11, 2019

(30) Foreign Application Priority Data

Jan. 10, 2018   (EP) .................................... 18150954

(51) Int. Cl.
*B24B 49/12*      (2006.01)
*G01B 11/30*      (2006.01)
*B23F 23/12*      (2006.01)

(52) U.S. Cl.
CPC .......... *B24B 49/12* (2013.01); *B23F 23/1218* (2013.01); *G01B 11/303* (2013.01)

(58) Field of Classification Search
CPC ......... B24B 49/12; B24B 49/02; B24B 49/03; B24B 49/04; B24B 49/045; B24B 49/05;
(Continued)

(56) References Cited

U.S. PATENT DOCUMENTS

2002/0186370 A1* 12/2002 Roesner .............. B24B 27/0683
                                                                356/301
2007/0028734 A1*  2/2007 Sekiya .............. H01L 21/67259
                                                                 83/72
(Continued)

FOREIGN PATENT DOCUMENTS

DE        3827752 A1    2/1990
DE       10032498 A1    1/2002
(Continued)

OTHER PUBLICATIONS

Search Report for Application No. EP18150954, dated Aug. 3, 2018, 5 pages.

*Primary Examiner* — Joel D Crandall
*Assistant Examiner* — Michael A Gump
(74) *Attorney, Agent, or Firm* — McCarter & English, LLP (57) ABSTRACT

Apparatus with a rotationally drivable receptacle for a grinding tool to be tested, wherein the apparatus comprises:
an optical testing apparatus arranged such that the grinding tool, while being rotatably driven, is at least partially irradiated by light emanating from an emitter of the testing apparatus, and that at least a portion of the light from the grinding tool is reflectable in the direction towards a sensor of the testing apparatus, wherein the sensor is adapted to provide test information,
a computing device which is designed for processing the test information in order to determine a 3-dimensional vector model of the grinding tool from macroscopic basic information,
a memory in which a target vector model is stored,
a computing device which is designed for comparing the vector model with the target vector model in order to enable the determination of deviations between the vector models.

13 Claims, 6 Drawing Sheets

(58) Field of Classification Search
CPC ....... B24B 49/186; B24B 49/10; B24B 47/25; B23F 23/1218; B23F 23/1225; G01B 11/303; G06T 7/0004; G06T 7/001; G06T 7/521; G06T 2207/30164; G06K 9/00201; G06K 9/00214; B23Q 23/00; B23Q 17/0995
USPC ......... 451/5, 21, 22; 382/141, 152, 154, 218
See application file for complete search history.

(56) References Cited

U.S. PATENT DOCUMENTS

| | | | |
|---|---|---|---|
| 2008/0194186 A1* | 8/2008 | Himmelsbach | B24B 45/00 451/342 |
| 2015/0009321 A1* | 1/2015 | Goldstein | B23Q 17/2457 348/135 |
| 2015/0085080 A1* | 3/2015 | Hollenbeck | G01B 11/2545 348/47 |
| 2018/0128596 A1* | 5/2018 | Mies | G01B 11/2416 |
| 2018/0128608 A1* | 5/2018 | Zhang | G01B 21/20 |
| 2018/0185975 A1* | 7/2018 | Stach | B23Q 17/2241 |

FOREIGN PATENT DOCUMENTS

| | | | |
|---|---|---|---|
| DE | 102017000072 A1 | 7/2018 | |
| EP | 3231555 A1 | 10/2017 | |
| JP | 2627913 B2 * | 7/1997 | |
| JP | 2005-331274 A | 12/2005 | |
| JP | 2012-108037 A | 6/2012 | |
| JP | 2013-2810 A | 1/2013 | |
| JP | 2013-29350 A | 2/2013 | |
| JP | 2013029350 A * | 2/2013 | ............ G01B 11/24 |
| WO | 2016/169782 A1 | 10/2016 | |

* cited by examiner 20.1

METHOD FOR CHECKING A GRINDING TOOL AND CORRESPONDING DEVICE

CROSS-REFERENCE TO RELATED APPLICATIONS

This application claims priority under 35 U.S.C. §§ 119 (a)-(d) to European patent application no. EP 18 150 954.8 filed Jan. 10, 2018, which is hereby expressly incorporated by reference as part of the present disclosure.

FIELD OF THE INVENTION

The present disclosure relates to methods for testing a grinding tool and corresponding devices.

BACKGROUND

There are many technical areas in which grinding tools are used. An example is the gear cutting of gear wheels with grinding wheels, cup wheels and grinding worms.

In some cases, electroplated grinding tools are used for gear cutting, as they enable short grinding times and show low wear at high grinding stock removal rates. Such electroplated grinding tools are therefore suitable, for example, for machining wheel sets in large series production.

The electroplated or galvanic bonded grinding tools are referred to here in short as galvanic grinding tools. Galvanic bonded dressing tools (such as dressing rolls) are also referred to here as galvanic grinding tools.

In the case of the galvanic grinding tools in question, the base body of the grinding tool is coated with diamond abrasive grains and/or CBN abrasive grains (CBN stands for cubic boron nitride).

Correspondingly coated galvanic grinding tools have very good thermal resistance and offer high mechanical strength. Besides, they have good grip. However, it can be seen as a disadvantage that galvanic grinding tools cannot be dressed. On the other hand, galvanic grinding tools typically retain their shape and profile. This shape retention is also an advantage and galvanic grinding tools are therefore often used as forming tools.

Galvanic grinding tools cannot be dressed, but they can be recoated with some effort.

There is a need to check the shape retention of galvanic grinding tools.

For example, there are various measuring devices which are designed for tactile measurement of the condition and profile of surfaces. Typically, during mechanical scanning, a probe tip is guided over the surface to be measured. With galvanic grinding tools, however, the graininess of the surface and the hardness of the diamond or CBN abrasive grains lead to rapid destruction of the probe tip. Methods for tactile measurement are therefore only conditionally suitable for measuring the surface of galvanic grinding tools.

There is a need to be able to carry out tests on galvanic grinding tools as quickly and robustly as possible.

SUMMARY

It is therefore an object to provide a device and a corresponding method which enable fast and precise testing of galvanic grinding tools.

According to at least some embodiments, a method is provided which is designed to test a grinding tool in a device and which includes at least the following steps:

rotary driving the grinding tool around a tool spindle axis of the device, performing a test method by means of an optical testing apparatus which is arranged in the region of the grinding tool such that the grinding tool is at least partially irradiated during rotary driving by light which emanates from an emitter of the testing apparatus, and that at least part of the light is reflected by the grinding tool in the direction of a sensor of the testing apparatus, wherein the sensor provides test information, processing the test information by means of a computing device to determine macroscopic basic information in the form of a 3-dimensional vector model of the grinding tool, computer-aided comparison of the vector model with a target vector model, which is provided from a memory in order to determine deviations between the vector models.

According to at least some embodiments, a device (e.g., a measuring device or a grinding machine) includes a rotationally drivable receptacle for a grinding tool to be tested. The device is characterized in that it comprises:

an optical testing apparatus arranged in the region of the rotatably drivable receptacle such that the grinding tool, while being rotatably driven, is at least partially irradiated by light emanating from an emitter of the testing apparatus (30) and that at least a portion of the light from the grinding tool is reflectable in the direction of a sensor of the testing apparatus, wherein the sensor is adapted to provide test information, a computing device which is designed for processing the test information in order to determine a 3-dimensional vector model of the grinding tool from macroscopic basic information, a memory in which a target vector model is stored, a computing device adapted to compare the vector model with the target vector model in order to be able to detect deviations between the vector models.

For at least some of the embodiments, the 3-dimensional vector model defines the grinding tool at least by the edges of its base body.

For at least some embodiments, at least a first partial surface of the grinding tool is determined or mathematically precisely defined on the basis of the 3-dimensional vector model.

An application of the certain embodiments is advantageous when precision abrasives are concerned whose shape retention is essential for the grinding result.

At least some embodiments can be applied advantageously to galvanic grinding wheels, galvanic grinding worms and galvanic grinding pots (cup grinding wheels).

In some embodiments, an edge detection algorithm can be used to support the creating/determining of a vector model.

In some embodiments, the testing of the galvanic grinding tools is carried out in-line as part of a production process. This means that the method can be carried out within or on a gear cutting machine (e.g., a grinding machine) at least for some embodiments.

The basic macroscopic information may contain at least information relating to one or more of the following quantities:

diameter of the grinding tool,
width of the grinding tool,
pitch and/or slope of the grinding tool,
profile angle of the grinding tool,
profile thickness of the grinding tool,
point radius of the grinding tool.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, are described in more detail below with reference to the drawings.

DETAILED DESCRIPTION

In connection with this description, terms are used which are also used in relevant publications and patents. It should be noted, however, that the use of these terms is for convenience only. The inventive idea and the scope of protection of the patent claims shall not be restricted in interpretation by the specific choice of terms. The disclosure can easily be transferred to other conceptual systems and/or fields. The terms are to be used analogously in other specialist areas.

Figure 1A:
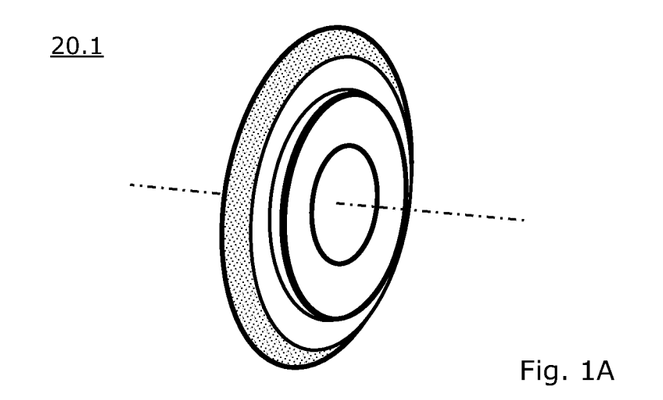
FIG. 1A shows a schematic perspective view of an embodiment of grinding tool in the form of a galvanic grinding wheel.
Figure 1B:
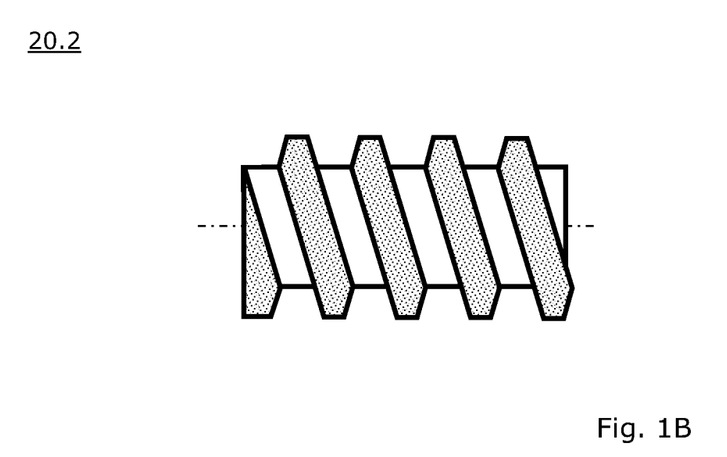
FIG. 1B shows a schematic side view of another embodiment of a grinding tool in the form of a galvanic grinding screw.
Figure 2:
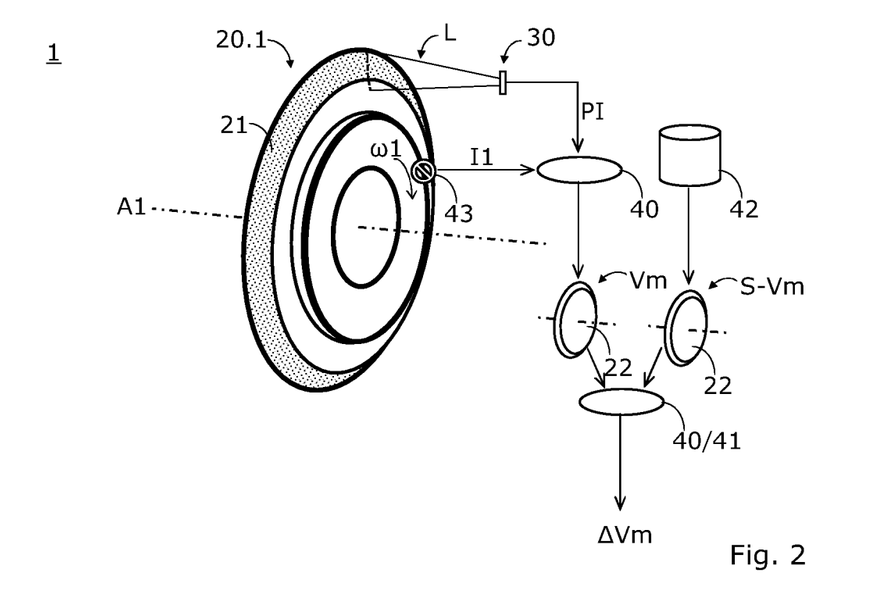
FIG. 2 shows a schematic representation of an embodiment of a testing device and operation thereof.

A first embodiment, which is shown in FIG. 2, relates to the contactless, optical testing of a galvanic grinding tool 20, here in the form of a galvanic grinding wheel 20.1. This grinding wheel 20.1 comprises an annular outer region 21 which is coated with abrasive grains (a pattern is shown here in the annular outer region to generally indicate the grains).

The annular outer area 21 is also referred to as the annular profile area or the active area. The term "active" is intended to indicate that this area interacts mechanically with a workpiece during grinding.

A method for testing an abrasive tool 20 includes the following steps for at least some embodiments:

Rotary driving the grinding tool 20 about a tool spindle axis A1 of an apparatus 1 (e.g. a gear cutting machine, a gear cutting center, or a measuring apparatus 10).

Performing a test method by means of an optical testing apparatus 30 which is arranged in the region of the grinding tool 20 in such a way that the grinding tool 20 is irradiated at least partially by light L during the rotary driving, as indicated in FIG. 2 in purely schematic form. The abovementioned light L is emitted by an emitter 31 of the testing apparatus 30 and is directed at the active area 21 of the grinding tool 20. In FIG. 2 it can be seen that the emitter 31 forms a linear light strip on the active area 21. At least part of the light L is reflected by the grinding tool 20 in the direction of a sensor 32 of the testing apparatus 30 (neither the emitter 31 nor the sensor 32 are shown in FIG. 2).

This sensor 32 provides test information PI as shown in FIG. 2 by an arrow labeled PI.

This test information PI is now processed by a computing device 40 to determine macroscopic basic information mG in the form of a 3-dimensional vector model Vm of the grinding tool 20.

Then the vector model Vm is compared with a target vector model S-Vm (which can be carried out, for example, by the same computing device 40 or by another computing device 41). The target vector model S-Vm can, for example, be provided from a memory 42, as indicated in FIG. 2. The comparison is carried out in such a way that deviations ΔVm between the vector models Vm and S-Vm can be mathematically determined.

FIG. 2 indicates that during the rotary driving of the grinding tool 20.1 angle and/or velocity information I1 (e.g. ω1) is detected by means of a sensor 43. This angle and/or velocity information I1 is processed together with the test information PI by the computing device 40 to determine the 3-dimensional vector model Vm of the grinding tool 20.1. FIG. 2 shows this model Vm in the form of a small image of the grinding tool 20.1. Since this is primarily about checking the active area of the grinding tool 20.1, the 3-dimensional vector model Vm, for example, comprises only two parallel, circular end faces 22 and an image of the active area 21.

The target vector model S-Vm, which defines, for example, an ideally shaped, unworn grinding tool 20.1, has the same structure as the 3-dimensional vector model Vm. Therefore, another small image with the reference numeral S-Vm is shown in FIG. 2. A computing device 40 or 41 can now compare the two models Vm and S-Vm computationally. As indicated in FIG. 2, this comparison results in a deviation that is referred to as ΔVm here. This deviation ΔVm is calculable.

A vector model in the sense of the present disclosure is a mathematical description of a body in 3-dimensional space. This requires a reference system, which is referred to here as the coordinate system. A vector model essentially consists of lines and points. For a simple 3-dimensional body, such as a cuboid, the corresponding vector model includes the vectors of the 12 edges of the cuboid. Surfaces of a 3-dimensional body are surrounded by a closed polyline.

In the sense of the present disclosure, the vector model is thus a mathematical representation of the linear, geometric structures of the body to be described. The linear geometric structures in at least some embodiments can be described, for example, by a sequence of points and the distances between these points.

A topological vector model is used for at least some embodiments, which also includes information on the spatial relationship of the points and/or lines.

A topological vector model is used with at least some embodiments, which also comprises circles and curves beside the lines and points, in order to be able to thus also illustrate more complex 3-dimensional bodies in a simpler manner in the vector model.

A topological vector model is used for at least some embodiments, in which each vector is represented by unique coordinates.

The straight edge of a 3-dimensional body is defined, for example, by the two bounding points and the straight connecting line. A circle can be defined e.g. by the circle center and the radius.

The vector model can also include so-called raster models in which surfaces are divided into regular rasters or meshes. In addition to the vectors used for the mathematical description of the edges, such a raster model thus includes a raster-like subdivision of surfaces.

A grinding wheel 20.1, as shown schematically in FIG. 2, typically comprises the already mentioned ring-shaped edge area 21 (also called a profile area), which is coated with abrasive grains. Since this primarily concerns a 3-dimensional vector model Vm of the grinding tool 20, the vector model Vm can concentrate on the description of the annular profile area 21, although the position of the tool spindle axis A1 is also important, since this tool spindle axis A1 can be used to define the reference system.

In FIG. 2, the vector model Vm of the grinding wheel 20.1 and the target vector model S-Vm are shown next to each other on the right next to the image of the grinding wheel 20.1 in the form of small illustrations. These small illustrations show that the corresponding vector models can each be described, for example, by two circular end faces 22 (here, however, only the end face 22 can be seen) which are disposed concentric to the tool spindle axis A1 and whose mutual distance determines the thickness of the profile area of the grinding wheel 20.1.

Profile area 21 itself can be described by a set of circles whose centers are all on the tool spindle axis A1. Each of these circles can have a different diameter and a different relative distance e.g. from the front circular end face 22. With an ideal grinding wheel 20.1, all these circles of the set of circles are absolutely circular (if the grain size of the abrasive grains is not taken into account on a microscopic level). The target vector model S-Vm can thus be defined, for example, by a set of circles, by the diameter of these circles and by the relative distance (measured parallel to the tool spindle axis A1).

A real grinding wheel 20.1, which has an imbalance, for example, comprises one or more deformed circles.

A computational comparison of the target vector model S-Vm with the 3-dimensional vector model Vm of the real grinding tool 20.1 would show this deviation (resulting from the imbalance) of the actual state compared to the target state.

Such a computational comparison can be carried out for at least part of the embodiments, for example, by means of mathematical vector calculations.

Figure 3A:
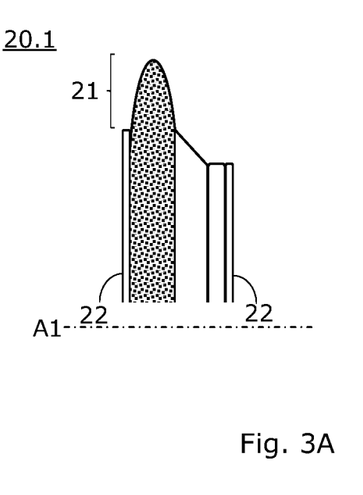
FIG. 3A shows a schematic side view of the upper half of another embodiment of a galvanic grinding wheel.

FIG. 3A shows a schematic side view of the upper half of a galvanic grinding wheel 20.1. In the example shown, this grinding wheel 20.1 comprises holders and counterholders which define a right and a left end face 22. These end faces 22 are perpendicular to the tool spindle axis A1. The base body of the galvanic grinding wheel 20.1, which is coated with abrasive grains at least in the annular profile area 21, is located between the holder and the counterholder. For simplicity's sake, profile area 21 here has a symmetrical, parabolic profile.

Figure 3B:
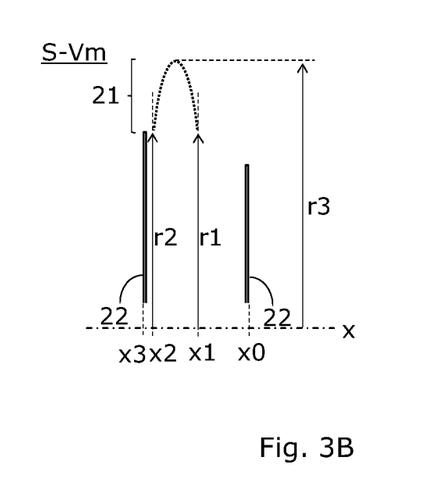
FIG. 3B shows a schematic side view of a vector model of the galvanic grinding wheel of FIG. 3A.

FIG. 3B shows a side view of an exemplary, schematized target vector model S-Vm of the galvanic grinding wheel 20.1 of FIG. 3A. Here, the x-axis coincides with the tool spindle axis A1. In this example, this x-axis serves as the reference axis for defining the vectors of the vector model. At position x0 is the right end face 22, at position x3 is the left end face 22, between these two bounding end faces 22 is the annular profile area 21. The parabolic profile mentioned above is represented in this example vector model by a set of circles. As can be seen in FIG. 3B, the parabolic profile therefore consists of a large number of points. Each of these points represents the intersection of one of the circles through the drawing plane. Each individual circle of the set of circles can be assigned an x-coordinate on the x-axis and a radius. Thus, each of the circles is uniquely defined in the reference system of the x-axis.

Since the profile is symmetrical, the two radii r1 at position x1 and r2 at position x2 have the same length. However, this is a special case. The uppermost point of the parabolic profile (where the maximum diameter of the galvanic grinding wheel 20.1 is located) has a radius r3.

Such a target vector model S-Vm can now be computationally compared with the optically measured vector model Vm of a used galvanic grinding wheel 20.1. Such a computational comparison is particularly simple if both models S-Vm and Vm use the same reference system (e.g. the x-axis). The two vector models S-Vm and Vm can, for example, be represented mathematically in the form of a matrix each. If these two matrices are subtracted, the deviations ΔVm are obtained.

If the two models S-Vm and Vm have different reference systems, a coordinate transformation can be carried out before the comparison in order to convert both models S-Vm and Vm into the same reference system.

Figure 4:
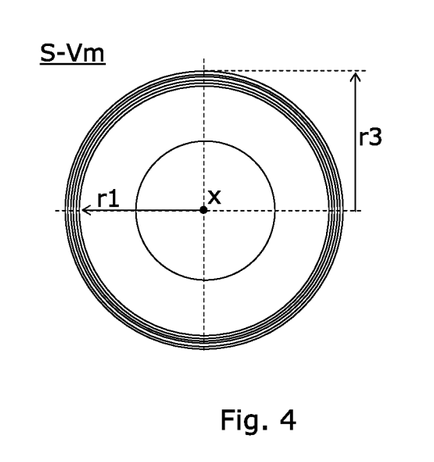
FIG. 4 shows a schematic front view of a vector model of another embodiment of a galvanic grinding wheel.

FIG. 4 shows a schematic front view of the vector model S-Vm of another galvanic grinding wheel 20.1. This vector model S-Vm comprises, as already described in the example of FIG. 3B, a set of circles concentric to the tool spindle axis A1 (also in this model the axes A1 and x coincide). In the example shown in FIG. 4 (as in FIG. 3B), the distances between the individual circles are equidistant. In order to avoid overloading the representation in FIG. 4, only 6 circles are shown here. Each of these circles is again defined by a position on the x-axis and by a radius. The innermost circle has a radius r1 and the outermost circle has a radius r3.

Figure 5:
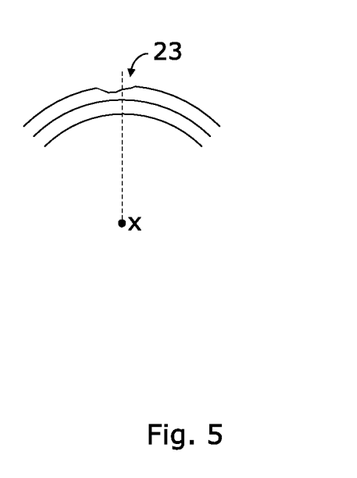
FIG. 5 shows an enlarged schematic front view of a vector model of another embodiment of a galvanic grinding wheel with a damaged circumference.

FIG. 5 shows a schematic front view of only one section of a vector model Vm of a real galvanic grinding wheel 20.1, which is clearly damaged at the circumference 23. Two of the three circular arcs have an ideal circular shape. The outermost arc, on the other hand, has a deviation from the vector model S-Vm. In a mathematical comparison, which can be carried out using matrix operations, for example, the result would be the deviation ΔVm.

Figure 6A:
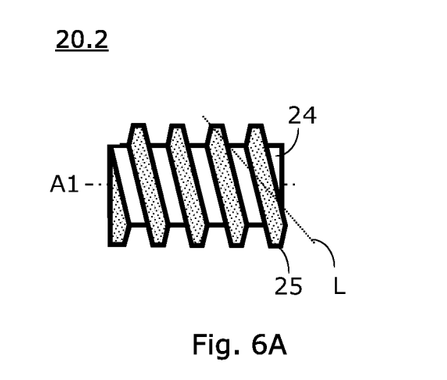
FIG. 6A shows a schematic side view of another embodiment of a galvanic grinding worm or screw.
Figure 6B:
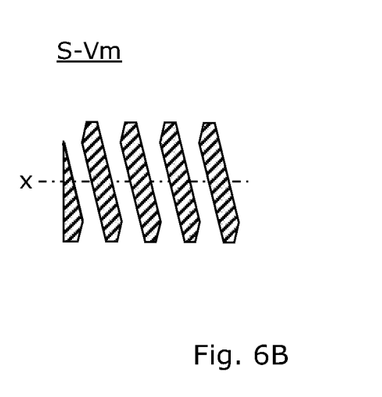
FIG. 6B shows a schematic side view of a vector model of the galvanic grinding worm of FIG. 6A.
Figure 6C:
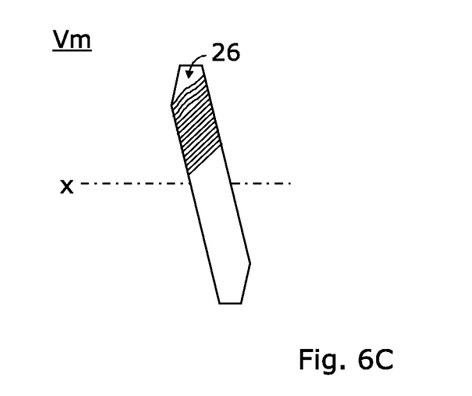
FIG. 6C shows an enlarged schematic view of a section of a vector model of another embodiment of a galvanic grinding screw with a locally "disturbed" surface.

FIG. 5 shows an example where a galvanic grinding wheel 20.1 is damaged. FIGS. 6A to 6C are used to describe an example in which an area of a galvanic grinding worm 20.2 has become clogged.

FIG. 6A shows a galvanic grinding worm 20.2. This grinding worm 20.2, which is shown here in strongly schematized form, comprises a cylindrical base body 24 which is provided with a circumferential tooth 25. At least the flanks of tooth 25 are covered with abrasive grains, as indicated in FIG. 6A. If it is assumed that this grinding worm 20.2 is used in such a way that only the flanks of tooth 25 are used for machining a workpiece, it is sufficient if the optical scanning by the optical testing apparatus 30 is designed and aligned in such a way that only tooth 25 reflects light L in the direction of the sensor 32 of the testing apparatus 30. In FIG. 6A, the light beam L (or bundle of rays) directed at the grinding worm 20.2 is represented by an oblique line. During optical scanning with the light beam L, the grinding worm 20.2 is rotated about the axis A1. In order to be able to scan the entire width of the grinding worm 20.2, a relative movement (shift movement) between the testing apparatus 30 and the grinding worm 20.2 can be used.

FIG. 6B shows as an example and in purely schematic form a possible target vector model S-Vm of the galvanic grinding worm 20.2 of FIG. 6A. Here the x-axis coincides again with the axis A1. By scanning with the optical testing apparatus 30, tooth 25 was "subdivided" into a number of parallel lines. Each of these lines is mathematically defined as a vector in a reference system (e.g. in relation to the x-axis). In addition, the edges of tooth 25 can be described by vectors, if desired. In FIG. 6B the edges are therefore indicated as outlines of tooth 25.

FIG. 6C shows as an example and in purely schematic form a possible vector model Vm of only one area of the galvanic grinding worm 20.2 of FIG. 6A. Only some of the parallel vectors of the set of vectors are shown in this figure. There is a disturbance 26 in one area. This disturbance can be recognized in that the otherwise parallel vectors show local deviations. A vector in the area of disturbance 26 can, for example, be represented by a polygon course instead of a continuous straight line.

If now the vector model Vm of FIG. 6C is superimposed with the target vector model S-Vm of FIG. 6B (e.g. within the scope of a mathematical comparison), such deviations can be determined.

In the schematic representations of the various figures, it should be noted that the emitter 31 generates a light beam that follows a straight line (or, in the case of the cross laser, two straight lines that are perpendicular to each other). If, however, the workpiece is viewed from a different angle (e.g. from the position of the sensor 32), it can be seen that the light line is deformed by the geometry of the workpiece. This type of deformation is not shown in the figures to avoid complicating the representation.

Instead of using circles to define the models S-Vm, Vm, polygon courses from a set of short vectors (ideally of the same length) can also be used, which, for example, lie against the circle like secants in a circle or tangents. For example, if you divide a circle into 360 equally large angular segments, the corresponding circle can be divided into 360 short vectors. Each of these vectors then has the same radius relative to a central reference axis, the same length and a different angular value.

A line laser is used as emitter 31 for at least some embodiments. The line length generated by the light L emitted by the emitter 31 can be determined from the opening angle of the line laser and the distance to the surface of the workpiece to be scanned. If the line laser has an aperture angle of 90 degrees, for example, then the line length to be generated corresponds to twice the laser distance.

Figure 7:
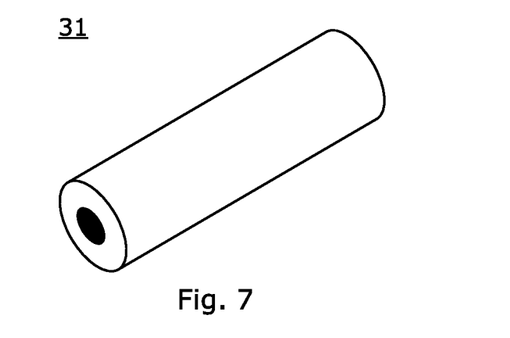
FIG. 7 shows a schematic perspective view of an embodiment of an emitter.

FIG. 7 shows an example of a cylindrical line laser which is suitable as an emitter 31. The aperture of the laser at which the light beam exits is shown here in black.

Figure 8:
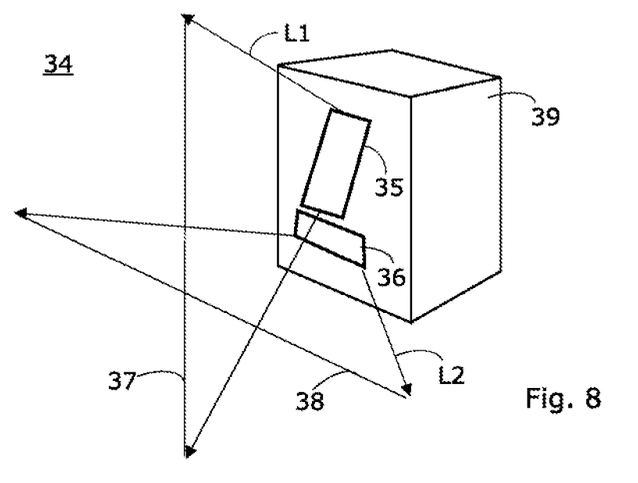
FIG. 8 shows a schematic perspective view of an embodiment of an optical testing apparatus comprising a cross laser.

Instead of a line laser, a cross laser can also be used, which laser, instead of a light line, projects a light cross consisting of two crossing lines onto the workpiece. FIG. 8 shows the two optical apertures 35, 36 of an exemplary cross laser 34. The upper aperture 35 is designed to emit a vertical light beam L1. The lower aperture 36 is designed to emit a horizontal light beam L2. The light beam L1 generates a first light line 37 on the workpiece and the light beam L2 generates a second light line 38. This allows vectors disposed perpendicularly to each other to be determined in one scanning pass. In such a case, the corresponding vector models include a grid of intersecting lines. For example, the cross laser 34 can comprise two orthogonally mounted mirrors to emit the two light beams L1, L2.

Instead of a line laser or a cross laser, a rotation laser (e.g. with a moving mirror arrangement) can also be used.

A detector group consisting of light-sensitive elements (e.g. photodiodes or phototransistors) is used as sensor 32 for at least some embodiments. A detector group can, for example, comprise a linear arrangement of several light-sensitive elements.

A laser is used as emitter 31 in at least some embodiments, whose light beam is modulated (e.g. pulsed) in order to reduce the sensitivity due to interfering light and disturbing reflections. In this embodiment, emitter 31 and sensor 32 are matched to each other with regard to the modulation type.

For at least some embodiments, the optical testing apparatus 30 may be designed so that the emitter 31 and the detector 32 transmit and receive the same optical beam path. It is also possible to construct the optical testing apparatus 30 in such a way that the emitter 31 and the detector 32 work with different optical beam paths.

The workpiece is optically scanned in at least some embodiments and then reconstructed computationally in 3-dimensional space in the form of a vector model Vm.

The test information PI can be processed with an edge detection algorithm for at least some of the embodiments. In this case, pixels that lie on a polyline or polygon course are defined mathematically by a corresponding vector or by a corresponding sequence of vectors. At the same time or additionally, other pixels (e.g. individual image disturbances) can be suppressed.

Figure 9:
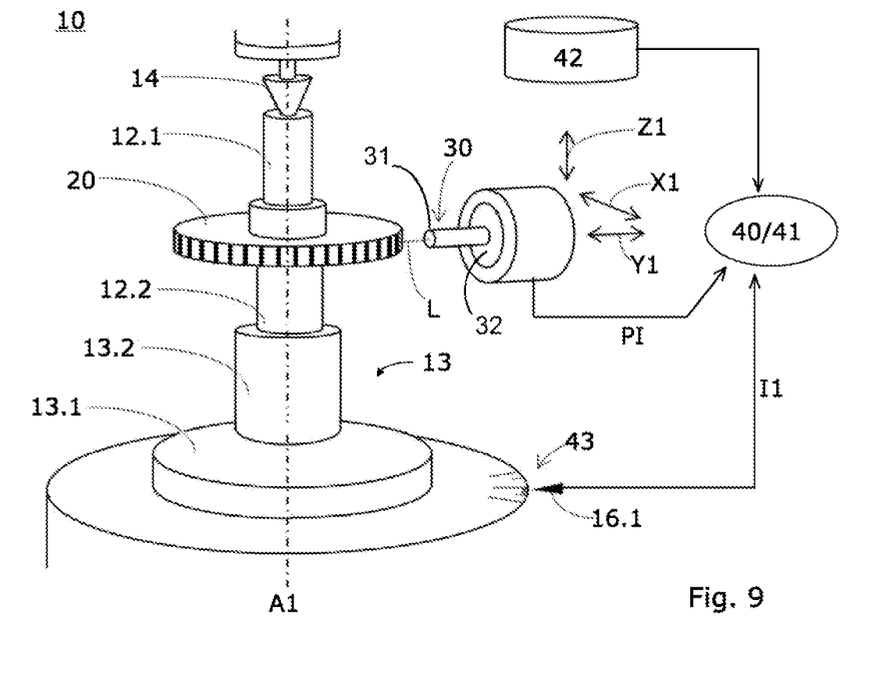
FIG. 9 shows a schematic perspective view of another embodiment of a measuring device.

FIG. 9 shows a subrange of a (coordinate) measuring apparatus 10. This measuring apparatus 10, which is also generally referred to here as apparatus 1, comprises at least one rotationally drivable receptacle 13, 14 for a grinding tool 20 to be tested. A grinding wheel 20.1 in the form of a thin cylindrical disc is shown here. The vertical lines along the circumference of the thin cylinder disc schematically represent the linear scanning by a line laser.

The rotationally drivable receptacle 13, 14 comprises a (rotary) table 13.1 with a spindle or receptacle 13.2 for the grinding tool 20. Optionally, an accompanying centering device 14 can be used, which serves as a counter bearing. To be able to clamp the grinding wheel 20.1, it was provided in the example shown with two shaft stubs 12.1, 12.2 which are screwed together. On the right the optical testing apparatus 30 can be seen in FIG. 9. A light beam L is shown here, which is emitted in the direction of the grinding wheel 20.1 and reflected from there. The sensor 32 and the emitter 31 are located inside the housing of the testing apparatus 30. The double arrows with the axis designations X1, Y1 and Z1 next to the testing apparatus 30 indicate that the (coordinate)

measuring apparatus 10 is designed to make a relative movement of the grinding wheel 20.1 relative to the testing apparatus 30.

In the area of the (rotary) table 13.1 a sensor 43 (here an angle decoder) can be provided to transmit the corresponding angle or rotation information I1 to a computer 40/41. The testing apparatus 30 provides the test information PI and the target vector model S-Vm is provided by a memory 42.

Figure 10:
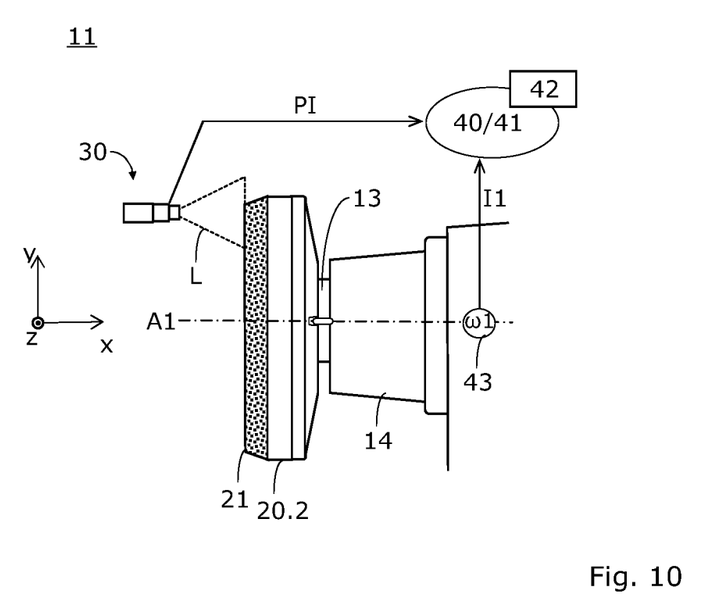
FIG. 10 shows a schematic perspective view of embodiment of a grinding machine.

FIG. 10 shows a section of a grinding machine 11. This grinding machine 11, also commonly referred to here as apparatus 1, comprises at least one rotationally drivable receptacle 13, 14 for a grinding tool 20 to be tested (a cup wheel 20.3 is shown here). The apparatus 1 or grinding machine 11 additionally includes:

An optical testing apparatus 30 arranged in the region of the rotationally drivable receptacle 13, 14, such that the grinding tool 20.3, while being rotationally driven, is at least partially irradiated by light L emanating from an emitter 31 of the testing apparatus 30. As shown in FIG. 10, at least part of the light L is reflected back from the grinding tool 20.3 in the direction of a sensor 32 of the testing apparatus 30. The sensor 32 is designed to provide test information PI.

A computing device 40/41 is used, which is designed for processing the test information PI in order to determine a 3-dimensional vector model Vm of the grinding tool 20.3 from the macroscopic basic information mG.

There is also a memory 42 in which a target vector model S-Vm is stored.

A computing device 40/41 is used, which is designed to compare the vector model Vm with the target vector model S-Vm in order to be able to determine deviations ΔVm between the vector models Vm, S-Vm by means of calculations.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method comprising:
   rotary driving a grinding tool about a tool spindle axis of an apparatus,
   performing a test using an optical testing apparatus configured to at least partially irradiate the grinding tool during the rotary driving step with light which emanates from an emitter of the optical testing apparatus such that at least part of the light is reflected by the grinding tool in a direction of a sensor of the optical testing apparatus, wherein the sensor is adapted to provide test information,
   processing such test information using a computing device and determining macroscopic basic information in the form of a 3-dimensional vector model of the grinding tool,
   performing a computer-aided comparison of the vector model with a target vector model located in a memory and determining deviations between the vector model and the target vector model,
   wherein the macroscopic basic information includes information relating to at least one of the following:
   diameter of the grinding tool,
   width of the grinding tool,
   one or more of pitch or slope of the grinding tool,
   profile angle of the grinding tool,
   profile thickness of the grinding tool, or
   point radius of the grinding tool.

2. The method according to claim 1, wherein the 3-dimensional vector model defines the grinding tool at least by a base body thereof.

3. The method according to claim 2, further including determining at least a first partial surface of the grinding tool based on the 3-dimensional vector model, and setting said first partial surface of the grinding tool in relation to a corresponding first partial surface of the target vector model.

4. The method according to claim 3, further including calculating a local deviation of the first partial surface of the grinding tool from the corresponding first partial surface of the target vector model after said setting step.

5. The method according to claim 1, wherein the 3-dimensional vector model defines the grinding tool at least by edges of a base body thereof.

6. The method according to claim 5, further including determining at least a first partial surface of the grinding tool based on the 3-dimensional vector model, and setting said first partial surface of the grinding tool in relation to a corresponding first partial surface of the target vector model.

7. The method according to claim 1, further including determining at least a first partial surface of the grinding tool based on the 3-dimensional vector model, and then setting said first partial surface of the grinding tool in relation to a corresponding first partial surface of the target vector model.

8. The method according to claim 7, further including calculating a local deviation of the first partial surface of the grinding tool from the corresponding first partial surface of the target vector model after said setting step.

9. The method according to claim 1, wherein the grinding tool is a galvanically coated grinding tool.

10. The method according to claim 9, wherein the grinding tool is a galvanic grinding wheel, a galvanic grinding worm or a galvanic cup wheel.

11. An apparatus comprising:
   a rotationally drivable receptacle configured to receive and rotatably drive a grinding tool,
   an optical testing apparatus configured to, while the grinding tool is being rotatably driven, at least partially irradiate the grinding tool with light emanating from an emitter of the optical testing apparatus such that at least a portion of the light is reflectable by the grinding tool in a direction towards a sensor of the optical testing apparatus, wherein the sensor is adapted to provide test information,
   a computing device configured to process the test information and to determine a 3-dimensional vector model of the grinding tool from macroscopic basic information,
   a memory configured to store a target vector model,
   wherein either (a) the computing device is further configured to compare the vector model with the target vector model and to determine deviations between the vector model and the target vector model; or (b) the apparatus has a further computing device configured to compare the vector model with the target vector model and to determine deviations between the vector model and the target vector model;
   wherein the macroscopic basic information includes information relating to at least one of the following:
   diameter of the grinding tool,
   width of the grinding tool, one or more of pitch or slope of the grinding tool,
profile angle of the grinding tool,
profile thickness of the grinding tool, or
point radius of the grinding tool.

12. The apparatus according to claim 11, wherein the apparatus defines a coordinate measuring device configured for testing the grinding tool.

13. The apparatus according to claim 11, wherein the apparatus defines a grinding machine configured for grinding a workpiece with the grinding tool and for testing the grinding tool.

* * * * *